Figure 8:
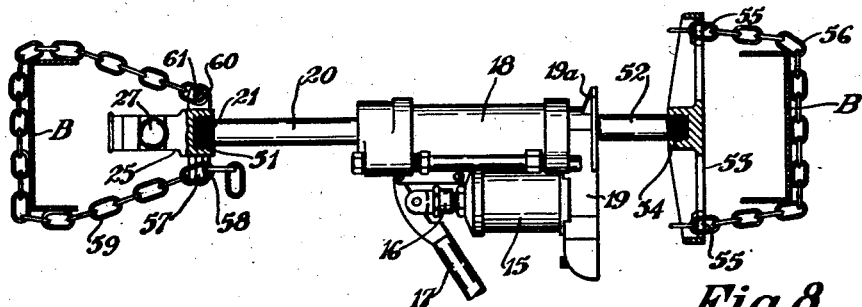

Aug. 6, 1935.  G. A. COUNTRYMAN  2,010,713
AUTOMOBILE REPAIR TOOL
Filed Dec. 11, 1933  2 Sheets-Sheet 1
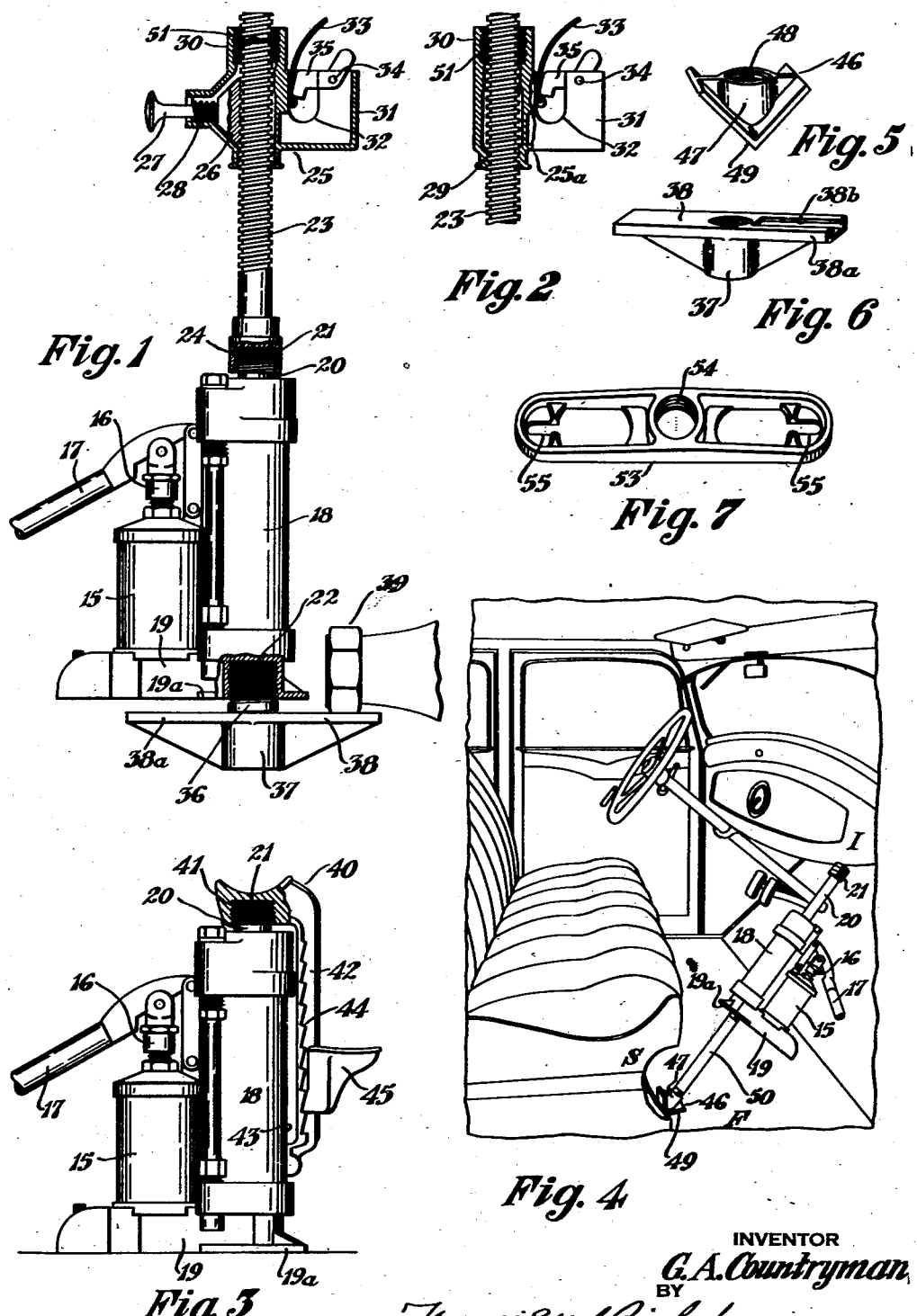
INVENTOR
G. A. Countryman
BY Freese and Bishop
ATTORNEYS Aug. 6, 1935. G. A. COUNTRYMAN 2,010,713
AUTOMOBILE REPAIR TOOL
Filed Dec. 11, 1933 2 Sheets—Sheet 2

INVENTOR
G. A. Countryman
BY Frease and Bishop
ATTORNEYS

Patented Aug. 6, 1935

2,010,713

UNITED STATES PATENT OFFICE 2,010,713

AUTOMOBILE REPAIR TOOL

Guy A. Countryman, Ashland, Ohio

Application December 11, 1933, Serial No. 701,752

8 Claims. (Cl. 153—32)

The invention relates to tools for use in combination with a jack for making repairs upon automobiles such as straightening fenders and bodies, bending or straightening frame members and the like.

The object of the improvement is to provide a tool including a plurality of interchangeable parts for engaging fenders or various parts of automobile bodies or frames and adapted to be connected to opposite ends of a jack either directly or through intermediate tube members depending upon the distance between parts of the automobile to be engaged by the tool.

Another object of the improvement is to provide a screw rod for connection to one end of a jack and having a housing adjustably mounted thereon either by means of screw threads or a ratchet and provided with a dog for engaging the edge portion of a fender or the like, a work engaging foot or bracket being arranged to be connected to the other end of a jack as by a tubular member for engagement with a hub cap or the like, whereby a jack may be operated to either pull the fender toward the hub cap or push it away therefrom.

A further object is to provide means upon said housing for attachment of a chain or the like to be passed around a frame member, a crosshead being adapted to be connected to the other end of a jack as by a tubular member and having means thereon for attachment of a chain adapted to be passed around another frame member whereby the jack may be operated to draw or bend said frame members toward each other, or by reversely operating the jack to bend or push said frame members away from each other.

Another object is to provide means whereby said housing may be used upon one end of the jack and provided with a chain passed around a frame member for bending or pulling said frame member toward the jack, the opposite end of the jack being adapted to contact with a stationary support.

A still further object of the improvement is to provide attachments adapted to be connected to opposite ends of a jack by means of tubular members or the like and arranged to be connected to shackle castings upon a frame for bending the horn of the frame.

Another object is to provide a work engaging head for connection to either end of a jack either directly or through an intermediate pipe or tubular member for engagement with various portions of automobile bodies or frames for bending the same to proper position.

A still further object is to provide a slide bar for connection to the head of a jack and having a foot adjustably mounted thereon for raising the engine or any heavy portion of an automobile.

Figure 9:
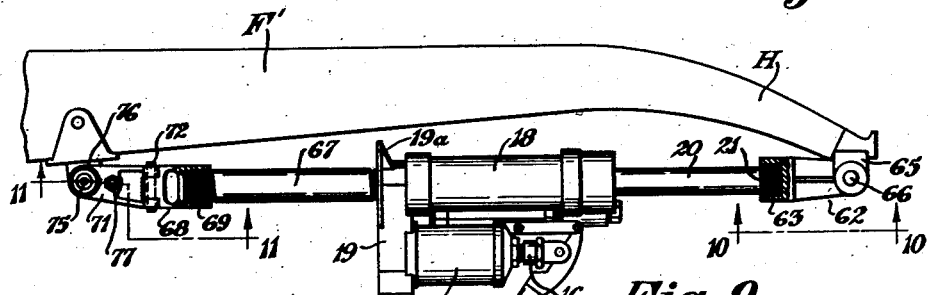
Figure 10:
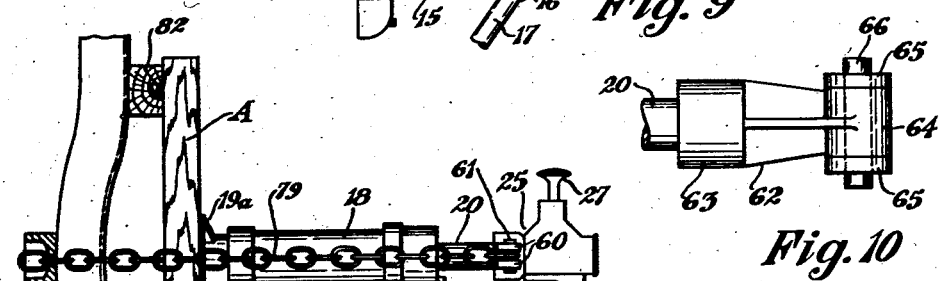
Figures 11, 12:
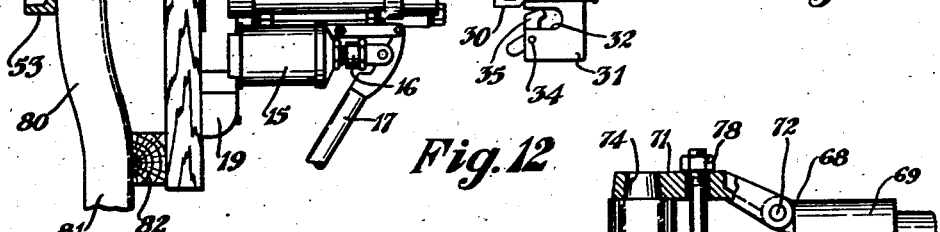
Figure 13:
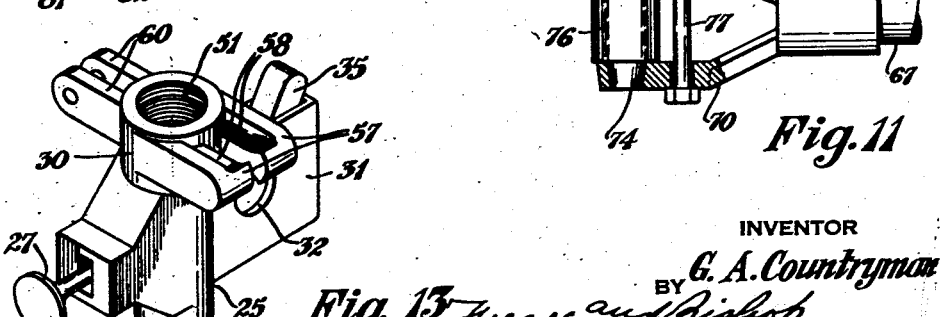

The above, together with other objects which will be apparent from the accompanying drawings or the following description, or which may be later pointed out, may be attained by constructing the improved automobile repair tool in the manner illustrated in the accompanying drawings, in which Figure 1 is a side elevation partially in section showing the improved automobile repair tool connected with a jack and adapted for straightening an automobile fender;

Fig. 2, a detail sectional view of a modified form of the fender clamping housing;

Fig. 3, a side elevation of the slide bar with adjustable foot mounted upon a jack;

Fig. 4, a perspective view of a portion of the interior of an automobile showing one of the work engaging heads in use for raising or straightening the instrument board of the automobile;

Fig. 5, a detached perspective view of the work engaging head shown in Fig. 4;

Fig. 6, a similar view of the foot or bracket shown in Fig. 1;

Fig. 7, a detached perspective view of the chain engaging crosshead;

Fig. 8, a sectional elevation showing the use of the chain engaging crosshead and the housing for bending two spaced frame members;

Fig. 9, an elevation showing the use of the shackle engaging attachments for bending the horn of a frame;

Fig. 10, an enlarged detail elevation taken as on the line 10—10, Fig. 9;

Fig. 11, an enlarged detail sectional elevation taken as on the line 11—11, Fig. 9;

Fig. 12, an elevation showing the use of the housing with chain for bending or straightening one frame or beam member; and Fig. 13, a detail perspective view of the housing shown in Figs. 1, 8 and 12.

Similar numerals refer to similar parts throughout the drawings.

My improved automobile repair tool is adapted to be used in connection with a suitable jack, preferably a double acting hydraulic jack such as disclosed in my pending application Serial No. 684,873, filed August 12, 1933, Patent No. 1,985,151, dated Dec. 18, 1934. Such a jack is illustrated in the accompanying drawings and may include generally a hydraulic pump located within the reservoir housing 15 and having therein a plunger 16 operated by a lever handle 17 and a hydraulic cylinder 18 located together with the pump upon the base 19, and provided with a piston or lifting rod 20 having a threaded head 21, there being a threaded socket 22 in the base, preferably in alignment with the piston or lifting rod 20.

In Fig. 1 is shown an arrangement of the improved tool for straightening automobile fenders, in which a screw threaded rod 23 is provided at one end with an internally threaded socket 24 adapted to be screwed upon the threaded head 21 of the piston or lifting rod 20 of the jack. A housing, preferably in the form of a casting, indicated generally at 25, is adjustably mounted upon the screw 23 and may be provided with a toothed ratchet 26 operated as by the button 27 and adapted to be normally held in mesh with the threads of the screw as by the coil spring 28, in order to quickly adjust the housing upon the screw and to hold it in adjusted position thereon.

If desired, this housing may be made as indicated generally at 25a in Fig. 2, and internally threaded as at 29 for threaded engagement upon the screw 23 whereby the housing may be adjusted upon the screw.

At one side of the tubular portion 30 of the housing is mounted a hollow work arm 31 slotted as at 32 for receiving the edge portion of a fender or the like as indicated at 33. Within this slot and pivoted to the arm 31, as at 34, is a dog 35 which cooperates with one side of the slot 32 for gripping and holding the fender or other work, as shown in Figs. 1 and 2. This dog is so pivoted within the slot that any tendency to raise the inner end of the dog will cause the same to clamp the fender tightly against the side of the slot 32.

A short tubular member or pipe 36 has one end threaded into the socket 22 in the base of the jack, the internally threaded socket portion 37 of a head in the form of a bracket or flat foot 38 being threaded upon the other end of said short pipe and adapted to engage the hub cap of the automobile indicated generally at 39. The tubular member 36 and the screw threaded rod 23 thus form intermediate members between the work engaging heads and the jack. For pulling the fender downward, the head or bracket 38 is engaged below the hub cap as shown in Fig. 1 but if it is desired to raise the fender at any point, the position of the head or bracket 38 is reversed so that the same engages the top of the hub cap. The double acting jack may be operated to either pull the fender down or push the same upward at any desired point in order to properly straighten all parts of the fender.

Instead of attaching the foot 38 to the base of the jack by means of the tubular member or pipe 36, an extension 38a may be formed upon the opposite side of the socket portion 37, and provided with a channel groove 38b adapted to slidably receive the flanged extension 19a upon the base of the jack. This provides a connection which can be attached to or detached from the jack more quickly than the screw connection, and which slightly shortens the distance between the pulling ratchet and the hub cap.

In Fig. 3 is shown an attachment for the jack for getting under low bodies or parts of an automobile such as the engine, to raise the same to proper position. This attachment comprises a forging, casting or the like indicated generally at 40 and having an internally threaded socket 41 for engagement with the threaded head 21 of the piston or lifting rod of the jack, a depending slide bar 42 being formed thereon and arranged to engage a vertical guide 43 upon the jack. Teeth 44 are formed upon the slide bar for adjustably securing the foot 45 which is slidably mounted on the bar and adapted to engage under the low body to be lifted.

As shown in Fig. 4, a work engaging head such as indicated at 46 and shown in detail in Fig. 5, may be used for engaging in angles or corners. This head comprises the tubular portion 47 having the internally threaded socket 48 therein and the triangular or V-shape work engaging portion 49. This head may be attached to one threaded end of the pipe 50, the other end thereof being screwed into the socket in the base of the jack.

The head 46 may then engage any angular portion of the car such as the corner between the floor F and front seat S, as shown in Fig. 4, while the piston or lifting rod of the jack may engage the instrument board I or other portion adapted to be pushed upward or away from the point engaged by the head 46.

As shown in Fig. 8, the tool may be used for drawing or bending two frame members or beams toward each other. For this purpose the housing 25 may be removed from the screw 23 and the screw socket 51 thereof may be attached upon the screw threaded head 21 of the piston or lifting rod 20. A pipe or tubular member 52 may be threaded into the socket in the base 19 of the jack and the crosshead, generally indicated at 53, may be attached thereto as by the central screw threaded socket portion 54. This crosshead is provided at opposite ends with slots 55 to receive and lock links of a work engaging chain 56 or the like which may be located around one of the frame members or beams B.

The housing 25 has at one side a spaced pair of ears 57 which are undercut on the side toward the socket end 51, as indicated at 58, in order to receive and retain links of a work engaging chain 59, which is located around the other beam B and the other end of which is attached between the ears 60 as by a pin 61. Thus, when the double acting jack is operated to withdraw the piston or lifting rod 20, the frame members or beams B will be bent or pulled toward each other.

In Fig. 9 is shown the application of the tool to the horn of a frame for straightening or bending the same. For this purpose, a work engaging head indicated generally at 62, and illustrated in detail in Fig. 10, is attached to the threaded head 21 of the piston or lifting rod 20 of the jack as by the threaded socket 63, the longitudinally bored boss portion 64 thereof being received between the ears of the shackle casting 65 and secured thereto as by a pin or bolt 66.

A pipe or tubular member 67 has one threaded end secured within the threaded socket in the base of the jack and upon the other end is mounted the work engaging head indicated generally at 68 and shown in detail in Fig. 11. This work engaging head is provided with an internally threaded socket 69 and with two spaced arms 70 and 71, one of said arms being rigid and the other being pivotally or hingedly attached as at 72. Each of these arms is provided with an opening 74 preferably slightly tapered to receive the head and nut of the bolt 75 upon the shackle casting 76 which is clamped between the arms and held in clamped position as by a bolt 77 extended through suitable apertures in both arms and provided with a nut 78. By operating the jack in either direction the horn portion H of the frame F" may be bent upward or downward as desired.

In Fig. 12 is shown the manner in which one beam or frame member may be bent by use of the housing 25 attached directly to the screw threaded end of the piston or lifting rod 20 of the jack and having a work engaging chain 79 connected thereto and to the crosshead 53 which may be placed over the bent portion 80 of the beam or frame member 81 to be straightened, a straight beam or bar A spanning said bent portion and having blocks 82 at each end engaging the beam 81, the base 19 of the jack resting upon the straight beam or bar A. By operating the jack to raise the lifting rod 20, the bent portion 80 of the beam 81 will be drawn back into proper position.

I claim:

1. In combination with a jack having a threaded socket in its base and a lifting rod with a threaded end, work engaging heads having threaded connections, and intermediate members having threaded connections for attachment to said threaded socket and threaded end of the lifting rod and to said work engaging heads.

2. In combination with a jack having a threaded socket in its base and a lifting rod with a threaded end threaded intermediate members for attachment to said threaded socket and threaded end of the lifting rod, a work engaging head connected to the end of one of said intermediate members, a work engaging head adjustably mounted upon the other intermediate member, and means for holding the last named work engaging head in adjusted position upon the corresponding intermediate member.

3. In combination with a jack having a threaded socket in its base and a lifting rod with a threaded end, threaded intermediate members for attachment to said threaded socket and threaded end of the lifting rod, a work engaging head connected to the end of one of said intermediate members, a work engaging head adjustably mounted upon the other intermediate member, and a ratchet for holding the last named work engaging head in adjusted position upon the corresponding intermediate member.

4. In combination with a jack having a lifting rod with a threaded end, means for longitudinally moving the lifting rod relative to the jack, a head having a threaded socket for attachment to said threaded end of the lifting rod, a work engaging chain, and means on said head for connecting opposite ends of said chain.

5. In combination with a jack having a base at one end and a lifting rod at the other end, heads, means for connecting said heads to the base and lifting rod respectively, two work engaging chains, and means for connecting opposite ends of each chain to one of the heads.

6. In combination with a jack having a base at one end and a lifting rod at the other end, heads, means for connecting said heads to the base and lifting rod respectively, two work engaging chains, and means for adjustably connecting opposite ends of each chain to one of the heads.

7. In combination with a jack having a base with a flanged extension thereon and a lifting rod with a threaded end, a work engaging head having a channel groove to slidably receive said flanged extension, and a second work engaging head having a threaded connection for attachment to the threaded end of the lifting rod.

8. In combination with a jack having a base and a lifting rod, a work engaging head adapted to be connected to the end of the lifting rod and having a longitudinally bored boss portion arranged to be received between the ears of a shackle casting and a pin located through said bore and through said ears, and a work engaging head arranged to be connected to the base and having two spaced arms one of which is pivoted to the head, said arms having apertures arranged to receive the bolt head and nut upon a shackle casting and means for clamping said arms together upon the shackle casting.

GUY A. COUNTRYMAN.